United States Patent
Araujo et al.

(10) Patent No.: US 10,979,453 B2
(45) Date of Patent: Apr. 13, 2021

(54) CYBER-DECEPTION USING NETWORK PORT PROJECTION

(71) Applicant: International Business Machines Corporation, Armonk, NY (US)

(72) Inventors: Frederico Araujo, White Plains, NY (US); Douglas Lee Schales, Ardsley, NY (US); Marc Philippe Stoecklin, White Plains, NY (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 15/691,798

(22) Filed: Aug. 31, 2017

(65) Prior Publication Data

US 2019/0068642 A1    Feb. 28, 2019

(51) Int. Cl.
| | |
|---|---|
| *H04L 29/06* | (2006.01) |
| *H04L 12/713* | (2013.01) |
| *G06F 21/56* | (2013.01) |
| *H04L 12/26* | (2006.01) |
| *G06F 21/55* | (2013.01) |
| *G06F 21/57* | (2013.01) |

(Continued)

(52) U.S. Cl.
CPC ........ *H04L 63/1491* (2013.01); *G06F 21/554* (2013.01); *G06F 21/567* (2013.01); *G06F 21/577* (2013.01); *H04L 43/0864* (2013.01); *H04L 45/586* (2013.01); *H04L 63/1425* (2013.01); *G06F 21/50* (2013.01); *H04L 41/0886* (2013.01); *H04L 47/2483* (2013.01)

(58) Field of Classification Search
CPC ............. H04L 63/1491; H04L 63/1425; H04L 43/0864; H04L 45/586; H04L 41/0886; G06F 21/50
See application file for complete search history.

(56) References Cited

U.S. PATENT DOCUMENTS 8,549,640 B2    10/2013  Lyle et al.
9,495,188 B1 *  11/2016  Ettema ................ G06F 9/45533
(Continued)

OTHER PUBLICATIONS

Hyojoon Kim and Nick Feamster 'Improving network management with Software Defined Networking', IEEE Communications Magazine, pp. 114-119 (Year: 2013).*

(Continued)

*Primary Examiner* — Catherine Thiaw
(74) *Attorney, Agent, or Firm* — Jeffrey S. LaBaw; David H. Judson

(57) ABSTRACT

Decoy network ports and services are projected onto existing production workloads to facilitate cyber deception, without the need to modify production machines. The approach may be implemented in a production network that includes two segments. A production machine is reachable via the first segment, while a decoy machine that offers the network service expected from the production machine is reachable via the second segment. A deception router is configured in front of the two segments, and it is not visible on the link and network layers. The router inspects network traffic destined for the production machine. Based on a set of one or more conditions being met, the router determines whether to relay network packets to the production machine, or to redirect the packet to the decoy machine.

20 Claims, 4 Drawing Sheets

(51) Int. Cl.
  *G06F 21/50* (2013.01)
  *H04L 12/24* (2006.01)
  *H04L 12/851* (2013.01)

(56) References Cited

U.S. PATENT DOCUMENTS

| | | | | |
|---|---|---|---|---|
| 9,578,055 | B1* | 2/2017 | Khanal | H04L 63/1458 |
| 9,729,514 | B2* | 8/2017 | Lemaster | H04L 63/08 |
| 2003/0229809 | A1* | 12/2003 | Wexler | H04L 45/00 |
| | | | | 709/239 |
| 2004/0148521 | A1* | 7/2004 | Cohen | H04L 63/0263 |
| | | | | 726/22 |
| 2008/0262990 | A1* | 10/2008 | Kapoor | G06F 9/505 |
| | | | | 706/20 |
| 2011/0282642 | A1* | 11/2011 | Kruger | G06F 11/3668 |
| | | | | 703/27 |
| 2012/0278479 | A1* | 11/2012 | Miller | H04L 12/4633 |
| | | | | 709/224 |
| 2014/0153435 | A1* | 6/2014 | Rolette | H04L 63/0245 |
| | | | | 370/252 |
| 2015/0100625 | A1* | 4/2015 | Dilouya | H04L 12/2869 |
| | | | | 709/203 |
| 2016/0080414 | A1* | 3/2016 | Kolton | H04L 63/1491 |
| | | | | 726/23 |
| 2016/0080415 | A1* | 3/2016 | Wu | H04L 63/1491 |
| | | | | 726/23 |
| 2016/0323300 | A1* | 11/2016 | Boss | H04L 63/1416 |
| 2017/0093910 | A1 | 3/2017 | Gukal et al. | |
| 2017/0149825 | A1 | 5/2017 | Gukal et al. | |
| 2017/0223046 | A1* | 8/2017 | Singh | H04L 63/1491 |
| 2017/0310702 | A1* | 10/2017 | Chantz | H04L 63/1441 |
| 2017/0310705 | A1* | 10/2017 | Gopalakrishna | H04L 63/1491 |
| 2018/0007026 | A1* | 1/2018 | Fujishima | H04L 63/0807 |

OTHER PUBLICATIONS

Jema David Ndibwile, A. Govardhan, Kazuya Okada, Youki Kadobayashi 'Werb server protection against application layer DDoS attacks using machine learning and traffic authentication', IEEE 39th Annual International Computers, Software & Applications Conference, pp. 261-267 (Year: 2015).*

Supachai Tangwongsan, and Labhidhorn Pangphuthipong "A Model of Network Security with Prevention Capability by Using Decoy Technique", International Journal of Computer, Electrical, Automation, Control and Information Engineering vol. 1, No. 5, 2007, pp. 1273-1278 (Year: 2007).*

Terry Nelms and Mustaque Ahamad "Packet Scheduling for Deep Packet Inspection on Multi-Core Architectures ", ANCS'10, Oct. 25-26, 2010, La Jolla, CA, USA. , 11 pages (Year: 2010).*

Vincent E. Urias, William M.S. Stout, Han W. Lin "Gathering Threat Intelligence through Computer Network Deception", 2016, 6 pages , IEEE (Year: 2016).*

Anonymously, "Analytic forecasting of Future Electronic Cyber Threats with Deep Learning and Coevolutionary Strategies," http://ip.com/IPCOM/000243925D, Oct. 28, 2015.

Anonymously, "A method of routing based on security protocols," http://ip.com/IPCOM/000227448D, May 8, 2013.

Anonymously, "A Cross-Platform System and Method for Measuring Cyber-Bullying," http://ip.com/IPCOM/000225833D, Mar. 7, 2013.

Dillow, et al., "Enhancing I/O Throughput via Efficient Routing Placement for Large-scale Parallel File Systems," Oakridge Leadership Computing Facility, National Computer Center for Computational Sciences, 2011.

* cited by examiner

CYBER-DECEPTION USING NETWORK PORT PROJECTION

BACKGROUND

Technical Field

This disclosure relates generally to cyber security.

Background of the Related Art

Today, cyber attackers are breaching corporate networks using a myriad of techniques such as social engineering or water holing. More disturbing is that these attacks can go unnoticed for hundreds of days. These attacks not only enable the exfiltration of important confidential company data, but they also erode client trust. As a consequence, companies can no longer solely rely on perimeter-based defenses—such as intrusion detection systems (IDS) and firewalls—to protect their IT environments. More generally, traditional network traffic monitoring and misuse detection is unable to keep up with evolving attackers, sustains high error rates, and is akin to searching for a needle in an extremely large haystack. As a result, security researchers and companies alike must look inward to gain better visibility at every stage of the cyberattack lifecycle.

Adversaries typically perform initial reconnaissance missions before commencing actual attacks. Unfortunately, today's computer systems (e.g., networks, servers, services, APIs) are too honest and forthcoming in sharing tremendous amounts of information with attackers. Computer networking protocols indirectly contribute to this problem because they are designed to be efficient in terms of minimizing overhead to maximize throughput, and insightful in terms of minimizing information hiding to maximize troubleshooting capabilities. This basic design strategy, however, is often exploited by malicious attackers who, for example, leverage the protocol's troubleshooting capabilities to learn about the computer networks, machines connected and networked services offered using that protocol.

To provide a more concrete example, an attacker may scan an environment by sending ping requests to randomly chosen IP addresses in a subnet, and then collect the returned ping responses to learn about the machines present on the network. As another example, an attacker may enumerate all networked services (made available via so called network ports) on a machine by transmitting connection requests (e.g., TCP SYN packets), and then collecting the TCP SYN/ACK packets returned. Hence, with minimal effort, attackers can glean extremely valuable information on network topologies, currently running applications and their version and patch level, as well as potential vulnerabilities, all without the defender's knowledge. This information asymmetry favors attackers, allowing them to find a single weakness, while defenders are faced with the difficult task of keeping up.

Honeypots are closely monitored information systems resources that are intend to be probed, attacked, or compromised, conceived purely to attract, detect, and gather attack information. Honeypots and honey networks have been devised to address the first example scenario described above. In particular, by deliberate placement of dedicated decoy systems (e.g., non-production machines), attackers may be deceived into interacting with decoy machines and networks, such that defenders learn about the presence of an attacker, as regular users are not supposed to interact with the decoy systems. To address the second example scenario, a trivial solution entails setting up additional decoy processes or services on a production machine that an attacker may interact with. This approach, however, requires a colocation of multiple services on the same production machine and thus is inefficient and potentially disruptive to the machine.

There remains a need to provide alternative cyber deception techniques.

BRIEF SUMMARY

Instead of implemented the decoy on the production machine itself, the technique herein involves "projecting" decoy network ports and services onto existing production workloads (e.g., a web server), such that the decoy is transparent to the sender/initiator of the network traffic to the production workload. To the end, a production network preferably is configured (i.e., separated) into two (2) distinct segments, with both segments being identical at the link layer. One or more production machines, which need not be modified, are reachable via the first segment, while one or more decoy machines that offer the network service expected from the production machines are reachable via the second segment. Traffic intended for the production workloads thus may be relayed over one segment, or the other. To facilitate the technique of this disclosure, a deception router system is configured in front of the two segments, preferably just downstream of the externally-facing network access point (ingress). The deception router is not visible on the link and network layers (i.e., it does not have its MAC address or IP address configured on the corresponding network interfaces), and it acts as an invisible network bridge. When configured in this manner, the deception router system receives and can inspect all network traffic destined for the production workloads. Based on a set of conditions (e.g., destination rules, intrusion detection system (IDS) signatures, or the like), the deception router determines whether to relay network packets to their intended destination, namely, the production workloads, or to redirect the packets to the decoy machines. When the deception router determines that a deception action should be taken, traffic is redirected to a decoy workload (on a decoy machine) that is configured to listen to the same IP and MAC address as the production server, and to offer the decoy service on the port addressed.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
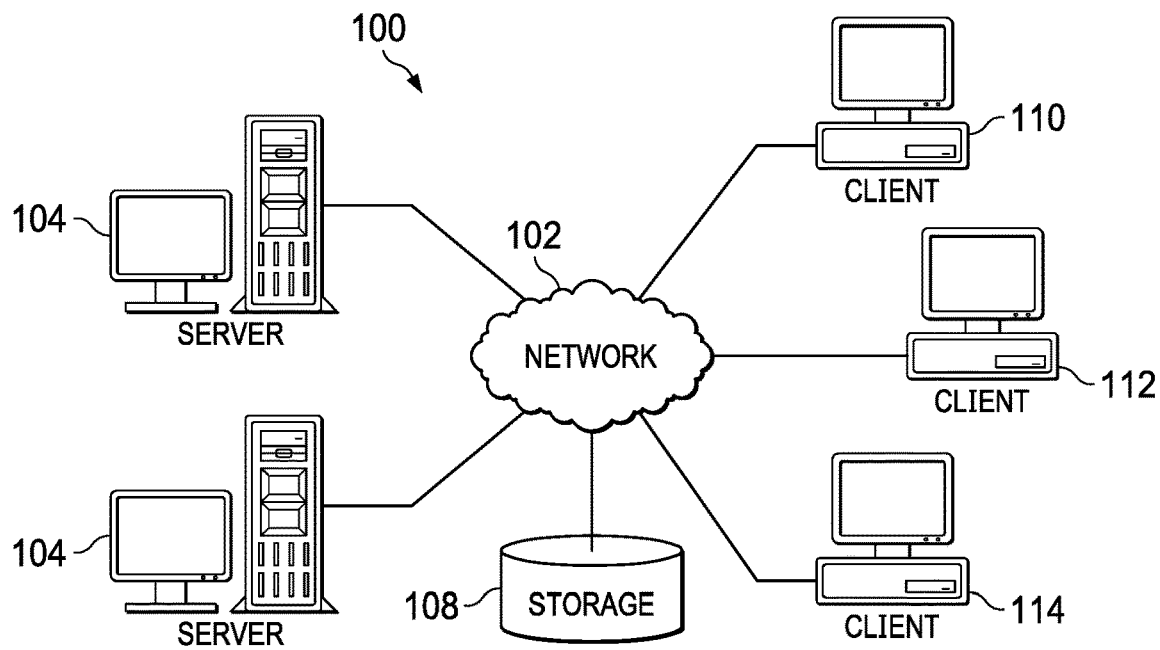
FIG. 1 depicts an exemplary block diagram of a distributed data processing environment in which exemplary aspects of the illustrative embodiments may be implemented.
Figure 2:
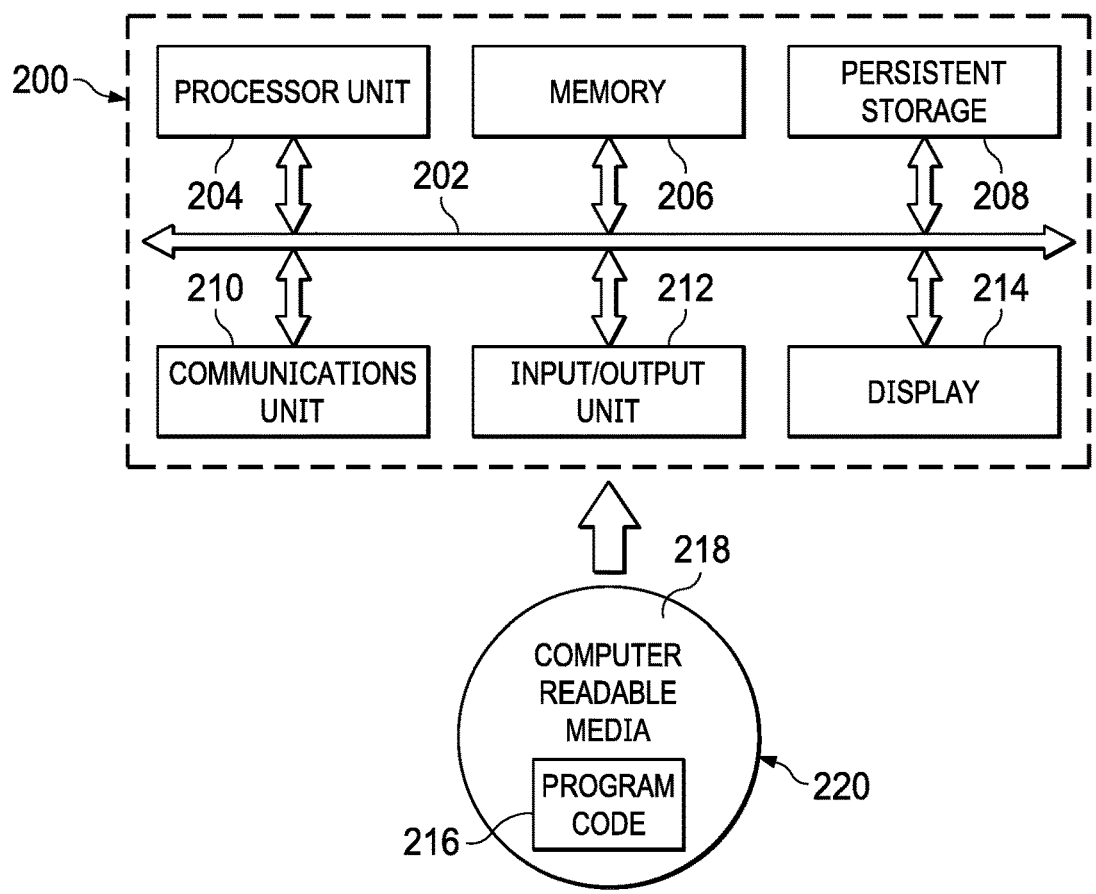
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 106. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 206, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 206 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 206 may take various forms depending on the particular implementation. For example, persistent storage 206 may contain one or more components or devices. For example, persistent storage 206 may be a hard drive, a flash memory, a rewritable optical disk, a rewritable magnetic tape, or some combination of the above. The media used by persistent storage 206 also may be removable. For example, a removable hard drive may be used for persistent storage 206.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 206. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 206.

Program code 216 is located in a functional form on computer-readable media 216 that is selectively removable and may be loaded onto or transferred to data processing system 200 for execution by processor unit 204. Program code 216 and computer-readable media 216 form computer program product 220 in these examples. In one example, computer-readable media 216 may be in a tangible form, such as, for example, an optical or magnetic disc that is inserted or placed into a drive or other device that is part of persistent storage 206 for transfer onto a storage device, such as a hard drive that is part of persistent storage 206. In a tangible form, computer-readable media 216 also may take the form of a persistent storage, such as a hard drive, a thumb drive, or a flash memory that is connected to data processing system 200. The tangible form of computer-readable media 216 is also referred to as computer-recordable storage media. In some instances, computer-recordable media 216 may not be removable.

Alternatively, program code 216 may be transferred to data processing system 200 from computer-readable media 216 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 206, and computer-readable media 216 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards, as well as with the OSI seven (7) layer networking model, is presumed.

Cyber-Deception Using Network Port Projection

As will be described, this disclosure provides a way to implement a highly-effective production network-based decoy technique that does not require burdening production systems that are running production (live) workloads. The technique may be implemented with respect to any production machine, regardless of type or the nature of the workload. A representative production machine may be a web server, an application server, a database server, a computing cluster, and so forth. The production machine may be implemented as a physical appliance or device, in a virtual machine (VM), and in other known computing system configurations.

To this end, the general approach herein involves "projecting" decoy network ports and services onto an existing production machine, and to selectively redirect (or shunt) network packets over to decoy machine ports and services when certain network traffic conditions are determined to exist. The approach is fully transparent to the client (sender/initiator) of the network traffic to the production workloads, and it is implemented without modifying the production machine.

Figure 3:
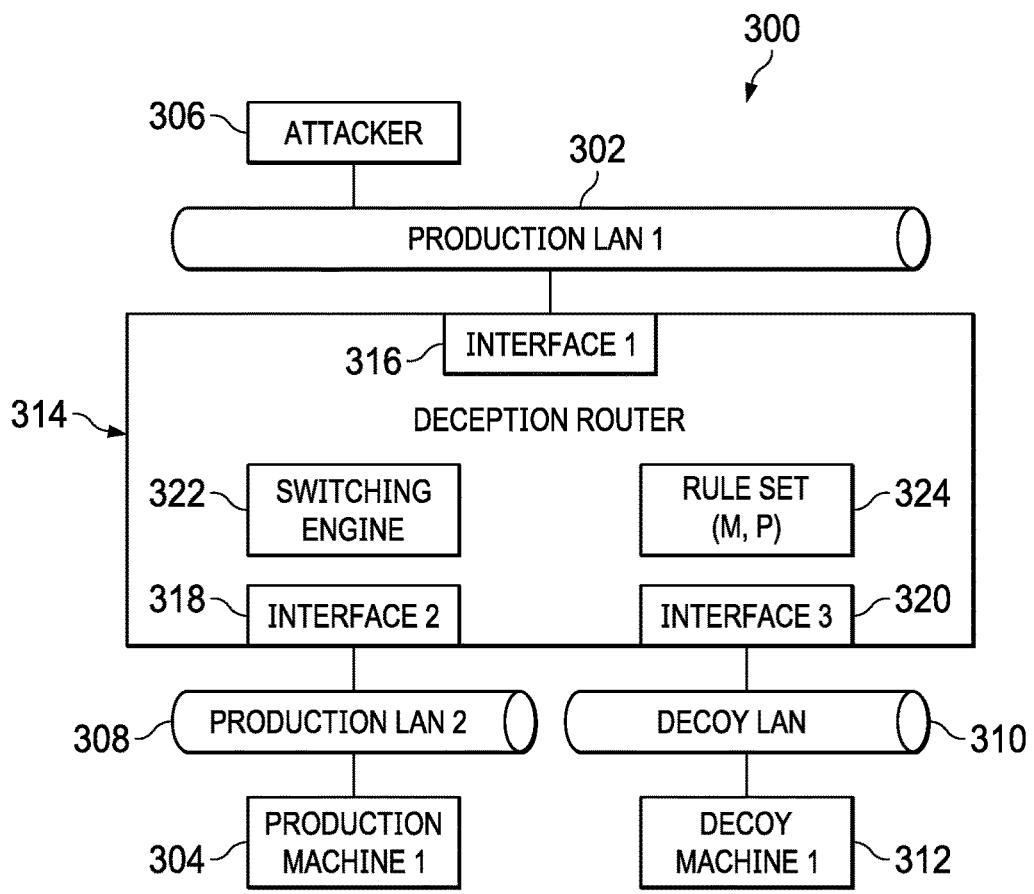
FIG. 3 illustrates an exemplary production network environment depicting an implementation of the port projection decoy technique of this disclosure.

To this end, and with reference to FIG. 3, a production network 300 preferably comprises a first production local area network (or subnet) 302 that is the network access point to the production network. One or more production machines 304 execute production workloads that may be targeted for attack by an attacker 306. According to this disclosure, and as depicted, the production network 300 is configured (i.e., separated) into two (2) distinct segments. To this end, the production network includes second LAN (or subnet) 306, and a decoy LAN (or subnet) 310. The first segment thus comprises the second production LAN (or subnet) 306, while the second segment comprises the decoy LAN (or subnet) 310. The segments are identical at the link layer. Each production machine 304 is reachable via the first segment 306 and not be modified (i.e., it does not require any special support for the functionality described herein). The second segment 310 supports one or more decoy machines 312 that offer the network service(s) expected. In particular, a respective decoy machine 312 is configured to be listed to the same MAC and IP address as the respective production machine 304, and as such it offers the decoy service (corresponding to the actual service running on the production machine) on the network port so addressed.

Traffic intended for the production workloads thus may be relayed and delivered over the first segment 306, or shunted over and delivered over the decoy LAN 310. There may be additional network segments (not shown). To facilitate the technique of this disclosure, a deception router system 314 is configured in front of the two segments, preferably just downstream of the externally-facing network access point (or ingress) provided by the LAN (or subnet) 302. According to this disclosure, the deception router system 314 is not visible on the link and network layers (i.e., it does not have its own MAC address or IP address), and as such it acts as an invisible network bridge between the production LAN 302, on the one hand, and either the production LAN 306 or the decoy LAN 310, on the other hand. When configured in this manner (i.e., between the ingress and the production machine), the deception router system 314 thus receives and can inspect all network traffic destined for the production workloads running on the production machines 304.

As depicted, the deception router system 314 interfaces to the first production LAN 302 via a first network interface 316. The deception router system 314 interfaces to the second production LAN 306 via a second network interface 316, and to the decoy LAN 310 via a third network interface 320. These network interfaces are implemented in a conventional manner with appropriate hardware and/or software resources.

Once the production network is configured in this manner, a set of one or more routing conditions can then be imposed on and applied to the network traffic that is intended for the production machines. To this end, the deception routing system 314 comprises a switching engine 322 that is controlled by a rule set 324. The switching engine typically comprises a computer program (a set of program instructions) executable by a hardware processor; in the alternative, the switching engine may be configured by firmware. There may be multiple instances of the switching engine, e.g., wherein a given switching engine may serve as a failover. The rule set 324 is maintained as a data structure (e.g., a data array, a linked list, a relational table, etc.) in a data store or memory associated with or part of the deception router system. According to this disclosure, a rule set 324 is configurable and preferably comprises a set of conditions (e.g., as defined by destination rules, intrusion detection system (IDS) signatures, or the like) that are used by a switching engine 322 to determine whether to relay a network packet to its intended destination, namely, the production workloads on the production machines 304, or instead to redirect or shunt the packets to the decoy machines 312.

According to this aspect of the disclosure, the routing decision made by the switching engine may be made on a network packet-by-network packet basis, on a network flow basis based on an analysis of a particular network packet, or some combination thereof. The particular nature of the rule set (i.e., the condition(s) by which packets are or are not redirected) is not an aspect of this disclosure, as the deception router system's switching engine 322 is designed to be used with varying rule set(s) and operating scenarios. The switching engine may execute continuously or on-demand, synchronously or asynchronously, statically or adaptively, as required. When the deception router system 314 determines that a deception action should be taken, the network packet(s) are then redirected to a decoy workload (on the decoy machine) that is configured to listen to the same IP and MAC address as the production server, and to offer the decoy service on the port addressed.

The deception router system 314 may be implemented in software executing in hardware, as a physical or virtual appliance, or it may execute as a dedicated function or service provided by some other machine or device (other than the production machines that might be the target of any attack).

A particular rule set may comprise one or more deception conditions. Generalizing, any arbitrary deception may cause a particular deception action to be taken (namely, routing the traffic to the decoy). A particular rule may comprise multiple deception conditions, and these conditions may be checked in sequence, concurrently, or otherwise. Deception conditions may be nested within one another such that more complex rules may be applied as desired. As noted, a typical condition may be a rule that simply checks whether an IDS signature is matched and, if so, causes a packet or packet stream to be redirected to the decoy. This example is not intended to be limiting of course.

Figure 4:
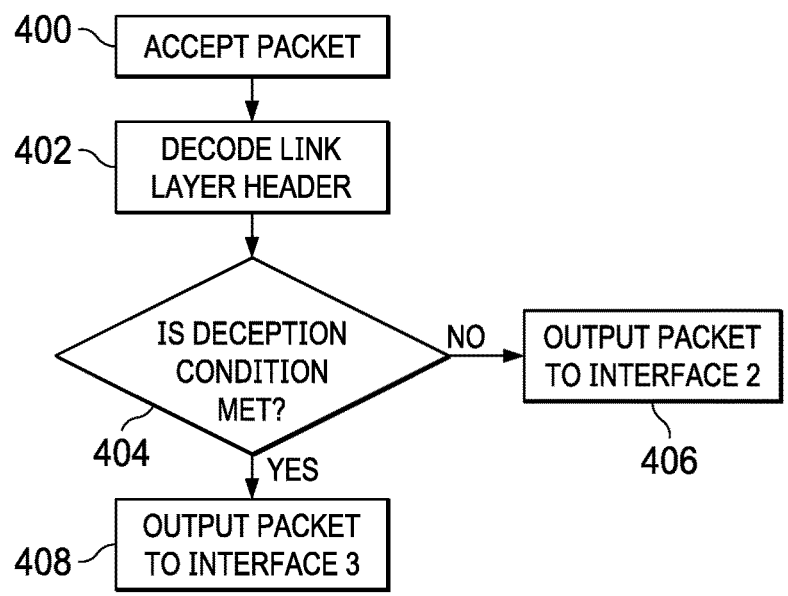
FIG. 4 is a process flow depicting the basic condition-based deception technique as implemented by the deception router of this disclosure.

FIG. 4 depicts a process flow showing the basic operation of the smart switching engine 322 of the deception router. At step 400, the switching engine accepts a network packet that has been received at the ingress over the production LAN 302. At step 402, the switching engine decodes the link layer header. A test is then performed at step 404 to determine whether a particular deception condition is met. If, however, the outcome of the text at step 404 indicates that the particular deception condition is met, the routine branches to step 406. At this step, the packet is output to the third interface 320, where it is consumed by the decoy workload that is configured to listen to the same MAC address and IP address as the production server, and that offers the decoy service on the port addressed. On the return path (e.g., responses), packet(s) are relayed from either the second interface 316 or third interface 320 back through the router system 314 to the first interface 316 only. In either direction, packet and header contents are not modified from and including Layer 2 and upwards in the OSI stack.

Figure 5:
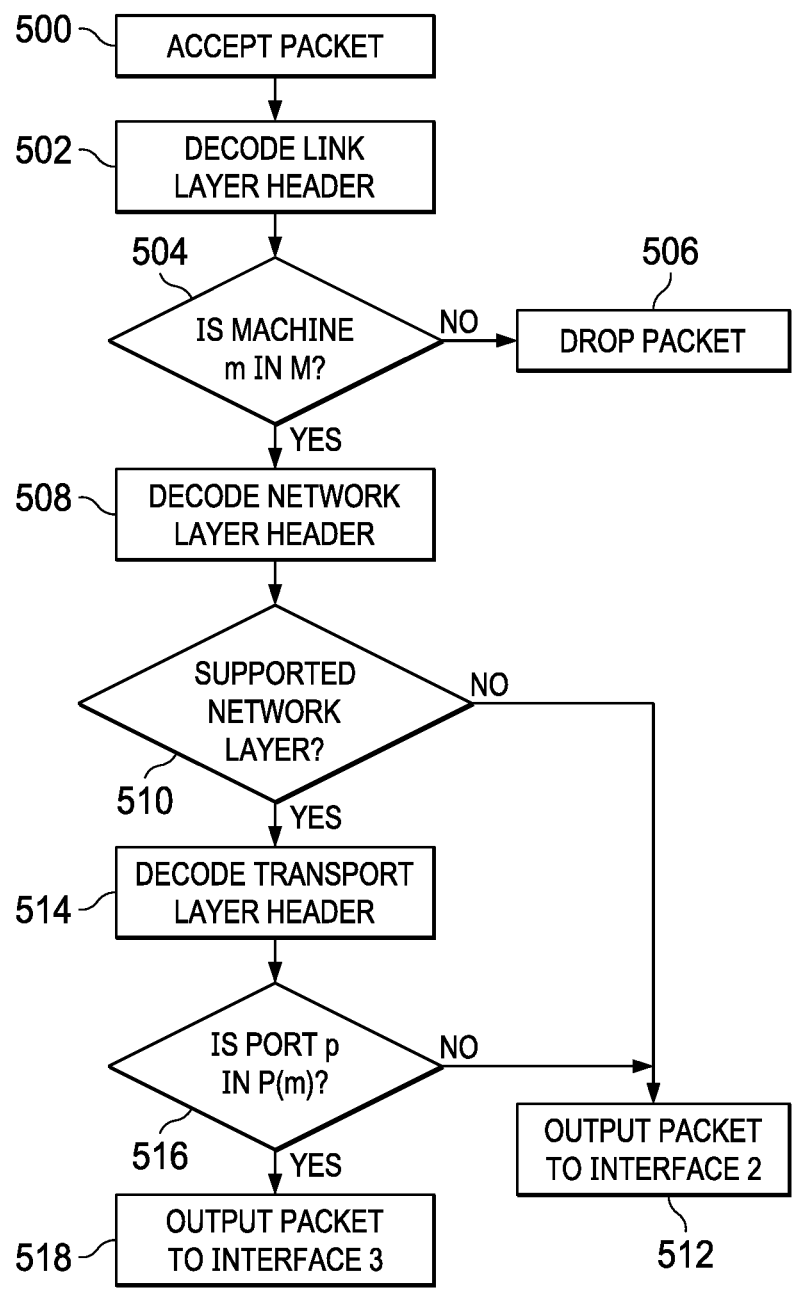
FIG. 5 is a process flow depicting an example of a destination-based deception scheme according to this disclosure.

FIG. 5 depicts a process flow showing a more detailed operation of the switching engine in the deception router. The routine begins at step 500 when a packet is accepted at the ingress (the first interface 316). At step 502, the L2 (link layer) header is decoded. In this embodiment, the conditions consist of a rule set (M, P), wherein M defines a set of MAC addresses on the second production LAN segment 306 along with one or more ports associated in P, for which a deception action should be taken. With this rule set, the switching engine 322 performs deep inspection of network headers (up to the transport layer/L4) to take decisions. To this end, at step 504, a test is performed to determine whether the packet's destination MAC address m is in the list of production machines M. If not, the routine branches to step 506 and the packet is handled according to a "N/A rule" (e.g., drop or relay to the second interface 316). If, however, the outcome of the test at step 504 is positive (because the packet's destination is in M), the routine continues to decode network and transport layer headers to determine the destination network port.

Thus, at step 506, the network layer header is decoded. At step 510, a test is performed to determine whether the network layer is supported by the decoy functionality. If not, the routine branches to step 512 and output the packet normally (i.e., to the second interface 3161. If, however, the output of the test at step 510 is positive, the routine continues at step 512 to decode the transport layer header. A test is then performed at step 514 to determine if the destination port is in P(m), i.e., the set of ports on machine m that should be projected on this machine. If the outcome of the test at step 514 is negative, control branches again to step 512, wherein the packet is delivered normally. If, however, the outcome of the test at step 514 is positive, the routine branches to step 516, wherein the packet is delivered to the third interface 320 and thus to the decoy machine that offers the decoy service on the port addressed. This completes the packet processing.

The technique provides significant advantages. In particular, the deception router along with its specific placement in the network environment provides for effective cyber deception using network port projection that is entirely transparent to any client, but that does not impact the production machines. In particular, the approach does not require setting up additional decoy processes or services on a production machine that an attacker may interact with, nor does it require any colocation of multiple services on any particular production machine. In this manner, the solution takes a fundamentally different approach than the prior art by instead projecting network ports (services) on a production machine, without modifying the production machine. The network ports (services) appear (from the outside) to exist on the production machine but in reality they do not, which is the notion of being "projected." As noted above, the deception router system is not visible on the link and network layer, and it acts as a smart bridge by performing the above-described packet routing to the decoy machine depending on whether a deception condition rule is triggered.

To ensure full client transparency, the approach herein is implemented in a way that does not leak timing information (e.g., statistically measurable different round trip times (RTTs)) with respect to the production and decoy systems. Preferably, the systems use the same protocol stacks but, if not, the systems are configured such that any such differences are not readily ascertainable from outside of the production network.

The deception router system can interact or interoperate with other network systems, devices, appliances, programs and processes. As one example, information about how packets are routed by the deception router can be reported to such other systems, e.g., to facilitate further monitoring and forensic analysis of a cyberattack, as well as to facilitate further mitigation efforts with respect to that attack.

The production network depicted in FIG. 3 is a preferred implementation, but it is not intended to be limiting. As noted, there may be additional network segments, or multiple machines on a particular network, and more complex routing schemes may be configured as desired.

The deception router may be implemented with a software-defined network (SDN), e.g., wherein the deception router implements a software-defined switch, or a network based on SDN adds a deception router component without necessarily adding a physical node between segments.

It is also not strictly required that the decoy service run on the same port and IP address. Thus, for example, if the deception router (or some associated entity) replaces or translates IP addresses and ports, the services projected could internally live on different ports. The use of identical segments (as described above), however, is preferred.

The techniques herein may be used with a host machine such as shown in FIG. 2 (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Typical cloud computing service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Typical deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 6:
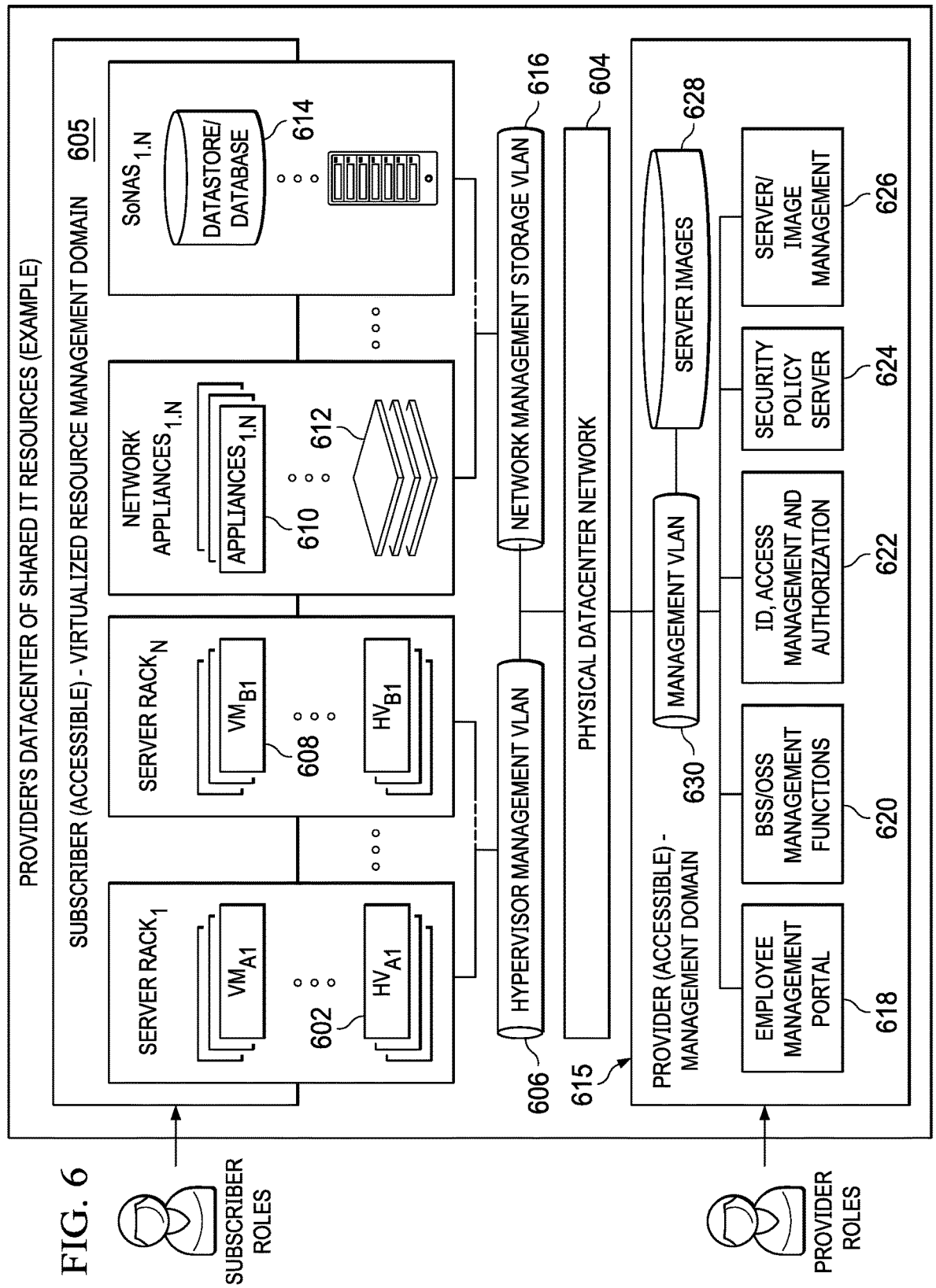
FIG. 6 illustrates a cloud computing infrastructure that supports virtualization of resources and in which the described techniques of this disclosure may be implemented.

FIG. 6 illustrates a typical Information Technology (IT) infrastructure that supports virtualization of resources and in which the described techniques of this disclosure may be implemented. In this example, the IT datacenter that provides shared (public) resources is the "provider" and a customer or company that uses these shared resources to host, store and manage its data and applications (in all forms) is the "subscriber" (or "customer" or "tenant"). In FIG. 6, an example virtual machine hosting environment (alternately referred to herein as a data center or "cloud") is illustrated. This environment comprises host machines (HVs) 602 (e.g., servers or like physical machine computing devices) connected to a physical datacenter network 604, typically via a hypervisor management VLAN 606. Although not depicted explicitly, typically the environment also includes load balancers, network data switches (e.g., top-of-rack switches), firewalls, and the like. As shown in FIG. 6, physical servers 602 are each adapted to dynamically provide one or more virtual machines (VMs) 606 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 610 are hosted in network appliances 612, and tenant data is stored in data stores and databases 614. The applications and data stores are connected to the physical datacenter network 604, typically via a network management/storage VLAN 607. Collectively, the virtual machines, applications and tenant data represent a subscriber-accessible virtualized resource management domain 605. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 615. This domain comprises a provider employee management portal 616, business support services (BSS) and operational support services (OSS) management functions 620, various identity and access management functions 622, a security policy server 624, and management functions 626 to manage the server images 626. These functions interface to the physical datacenter network via a management VLAN 630.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. In a non-limiting implementation, representative platform technologies are, without limitation, IBM System x® servers with VMware vSphere 4.1 Update 1 and 5.0.

As previously noted, the above-described components typically are each implemented as software, i.e., as a set of computer program instructions executed in one or more hardware processors. As has been described, the components are shown as distinct, but as noted this is not a requirement, as the components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates the above-described infrastructure. It may be available as a managed service, e.g., provided by a cloud service.

The components may implement any process flow (or operations thereof) synchronously or asynchronously, continuously and/or periodically.

The approach may be integrated with other enterprise- or network-based security methods and systems, such as in a STEM, or the like.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Aspects of this disclosure may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the deception router system is implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While a process flow above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The nomenclature used herein also should not be taken to be limiting.

The techniques herein improve computing functioning by providing cyber detection of attacks as they occur in computing systems more efficiently and without modifying production machines that are the attack targets. Computing systems that incorporate the techniques herein provide these advantages transparently and without disruption of production workflow, thereby increasing the reliability and availability of the underlying production machines. Computer systems implemented with the approach herein operate more efficiently and with less cyber security-specific processing and storage requirements than they would otherwise.

Having described the invention, what we claim is as follows:

1. A method for cyber security in a production network having a production machine that offers a production service on a port, the production network having an ingress, a first network segment, and a second network segment, the production machine being reachable via the first network segment, comprising:
    configuring a decoy machine to offer a decoy service corresponding to the production service, the decoy machine being reachable via the second network segment;
    after configuring the decoy machine, intercepting a network packet directed to the production service by an external initiator, the network packet being intercepted by a deception router configured at a location in the production network between the ingress and the first and second network segments;
    determining at the deception router and in response to intercepting the network packet whether a deception condition associated with the network packet is met; and
    when the deception condition is met, routing the network packet via the second network segment to the decoy machine instead of via the first network segment to the production machine;
    wherein configuring the deception router at the location provides that timing information differences with respect to routing via the first or second network segments are not ascertainable from outside the production network.

2. The method as described in claim 1 wherein the decoy service listens to a same MAC address and IP address as the production service, and offers the decoy service on the port.

3. The method as described in claim 1, wherein the deception condition is defined in a rule set.

4. The method as described in claim 3 wherein the rule set includes one or more intrusion detection signatures, and wherein the deception condition is met when an intrusion signature is matched.

5. The method as described in claim 1 further including returning a response from the decoy service.

6. The method as described in claim 5 wherein packet and header contents are unmodified from a data link layer or higher in a network operating stack as the network packet or the response from the decoy service are routed.

7. An apparatus for cyber security in a production network having a production machine that offers a production service on a port, the production network having an ingress, a first network segment, and a second network segment, the production machine being reachable via the first network segment, comprising:
    one or more processors;
    computer memory holding computer program instructions executed by the one or more processors, the computer program instructions configured to:
        configure a decoy machine to offer a decoy service corresponding to the production service, the decoy machine being reachable via the second network segment;
        after configuring the decoy machine, intercept a network packet directed to the production service by an external initiator, the network packet being intercepted by a deception router configured at a location in the production network between the ingress and the first and second network segments;

determine at the deception router and in response to intercept of the network packet whether a deception condition associated with the network packet is met; and when the deception condition is met, route the network packet via the second network segment to the decoy machine instead of via the first network segment to the production machine;

wherein configuring the deception router at the location provides that timing information differences with respect to routing via the first or second network segments are not ascertainable from outside the production network.

8. The apparatus as described in claim 7 wherein the decoy service listens to a same MAC address and IP address as the production service, and offers the decoy service on the port.

9. The apparatus as described in claim 7, wherein the deception condition is defined in a rule set.

10. The apparatus as described in claim 9 wherein the rule set includes one or more intrusion detection signatures, and wherein the deception condition is met when an intrusion signature is matched.

11. The apparatus as described in claim 7 wherein the computer program instructions further configured to return a response from the decoy service.

12. The apparatus as described in claim 11 wherein packet and header contents are unmodified from a data link layer or higher in a network operating stack as the network packet or the response from the decoy service are routed.

13. A computer program product in a non-transitory computer readable medium, the computer program product holding computer program instructions for cyber security in a production network having a production machine that offers a production service on a port, the production network having an ingress, a first network segment, and a second network segment, the production machine being reachable via the first network segment, the computer program instructions comprising program code executable in one or more processors and configured to:

configure a decoy machine to offer a decoy service corresponding to the production service, the decoy machine being reachable via the second network segment;

after configuring the decoy machine, intercept a network packet directed to the production service by an external initiator, the network packet being intercepted by a deception router configured at a location in the production network between the ingress and the first and second network segments;

determine at the deception router and in response to intercept of the network packet whether a deception condition associated with the network packet is met; and when the deception condition is met, route the network packet via the second network segment to the decoy machine instead of via the first network segment to the production machine;

wherein configuring the deception router at the location provides that timing information differences with respect to routing via the first or second network segments are not ascertainable from outside the production network.

14. The computer program product as described in claim 13 wherein the decoy service listens to a same MAC address and IP address as the production service, and offers the decoy service on the port.

15. The computer program product as described in claim 13, wherein the deception condition is defined in a rule set.

16. The computer program product as described in claim 15 wherein the rule set includes one or more intrusion detection signatures, and wherein the deception condition is met when an intrusion signature is matched.

17. The computer program product as described in claim 13 wherein the computer program instructions further configured to return a response from the decoy service.

18. The computer program product as described in claim 17 wherein packet and header contents are unmodified from a data link layer or higher in a network operating stack as the network packet or the response from the decoy service are routed.

19. A computing system, comprising:

a production network comprising an ingress, a first network segment, and a second network segment, the first and second network segments being identical on a link layer;

a production machine accessible via the first network segment, the production machine offering a production service on a port;

a decoy machine accessible via the second network segment, the decoy machine offering a decoy service on the port;

a deception router configured in the production network between the ingress and the production machine at a decoy port projected to appear as the production service running on the port;

the deception router configured to intercept a network packet directed to the production machine by an external initiator, to perform a deep header inspection on the network packet, the deep header inspection beginning at a link layer header and continuing up the network stack through a transport layer header, and responsive to an outcome of the deep header inspection that indicates that a destination port associated with the network packet is the port, to selectively route the network packet to the decoy machine to provide the external initiator a cyber deception;

wherein configuring the deception router at the decoy port provides that timing information differences with respect to routing via the first or second network segments are not ascertainable from outside the production network.

20. The computing system as described in claim 19 wherein the deception router implements a software-defined network switch to route the one or more network packets.

* * * * *